US008825881B2

(12) United States Patent
Mulcahy et al.

(10) Patent No.: US 8,825,881 B2
(45) Date of Patent: Sep. 2, 2014

(54) PREDICTIVE CACHING OF IP DATA

(71) Applicant: Bandwidth.com, Inc., Raleigh, NC (US)

(72) Inventors: James Mulcahy, Raleigh, NC (US); Sai Rathnam, Raleigh, NC (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 14/024,780

(22) Filed: Sep. 12, 2013

(65) Prior Publication Data

US 2014/0011538 A1   Jan. 9, 2014

(51) Int. Cl.
G06F 15/16 (2006.01)
H04L 29/08 (2006.01)
H04W 88/06 (2009.01)

(52) U.S. Cl.
CPC ........... *H04W 88/06* (2013.01); *H04L 67/2885* (2013.01); *H04L 67/2842* (2013.01); *H04L 67/2847* (2013.01)
USPC ........................................................ 709/228

(58) Field of Classification Search
CPC ............ H04L 67/2842; H04L 67/2847; H04L 67/2885; H04W 88/06
USPC ........................................................ 709/228
See application file for complete search history.

(56) References Cited

U.S. PATENT DOCUMENTS

| | | | |
|---|---|---|---|
| 2005/0254451 A1* | 11/2005 | Grosbach | 370/328 |
| 2010/0161831 A1* | 6/2010 | Haas et al. | 709/235 |
| 2010/0281118 A1* | 11/2010 | Donahue et al. | 709/206 |
| 2011/0057790 A1* | 3/2011 | Martin et al. | 340/539.13 |
| 2012/0023226 A1* | 1/2012 | Petersen et al. | 709/224 |
| 2013/0054729 A1* | 2/2013 | Jaiswal et al. | 709/213 |
| 2013/0151652 A1* | 6/2013 | Brech | 709/216 |
| 2013/0151654 A1* | 6/2013 | Brech | 709/216 |
| 2013/0166690 A1* | 6/2013 | Shatzkamer | 709/219 |

* cited by examiner

Primary Examiner — Larry Donaghue
(74) Attorney, Agent, or Firm — Gregory Stephens

(57) ABSTRACT

Disclosed is a method of predictively caching IP content data for a mobile device. In the mobile device, a content request is sent to an intelligent cache server over an IP network, the content request indicative of recurring IP content data of interest to the mobile device. The intelligent cache server retrieves the requested IP content data from content servers and queues the requested IP content data in a buffer associated with the mobile device. A notification message is sent to the mobile device indicating that the requested IP content is queued. The mobile device determines whether it is connected to a non-cellular IP network access point and automatically downloads the queued IP content data from the intelligent cache server when connected to a non-cellular IP network. The IP content data is stored in a cache memory in the mobile device. Other embodiments are disclosed.

15 Claims, 7 Drawing Sheets

100

300

400

500

600

700

PREDICTIVE CACHING OF IP DATA

BACKGROUND

Mobile devices such as smartphones and some tablet style computers are often equipped with multiple RF transceivers that are capable of wirelessly connecting with different networks. For example, a mobile device may employ a cellular transceiver to allow a user to make and receive telephone calls, send text messages, and exchange Internet Protocol (IP) data over a cellular access network. That same mobile device may also employ a second RF transceiver that operates on a non-cellular network such as, for instance, one that operates over the 802.11 family of protocols that are commonly known as WiFi. In addition, the mobile device may also employ another RF transceiver such as, for instance, one that operates over the 802.16 family of protocols that are commonly known as WiMax. The WiFi or WiMax transceiver(s) may be used for IP network access (e.g., Internet access) anytime the mobile device is within range of a WiFi or WiMax IP network access point.

In terms of user convenience and cost, it is preferable to utilize a non-cellular network transceiver such as the WiFi or WiMax transceivers over the cellular transceiver whenever possible. Non-cellular (e.g., WiFi or WiMax) access is generally free whereas cellular access to IP networks comes at a price. Moreover, the cost can escalate the more IP data is consumed.

As mobile devices such as smartphones become ubiquitous, the demand for 'mobile' IP data access continues to grow. Limiting such IP network access to cellular network access points only drives costs up for consumers and tax or stress the cellular carrier's IP data network. The end result may lead to higher costs and less than expected quality of service in terms of network access speeds or even the ability to establish and maintain an IP network connection in areas of high congestion. The ability to use non-cellular (e.g. WiFi or WiMax) IP connectivity greatly alleviates the aforementioned problems.

However, one of the greatest attributes of a mobile device is its mobility. This means that the user will often find herself without non-cellular connectivity at times but with a need or desire to consume IP data from sources external to the mobile device. The mobile device may do so utilizing the cellular access network for IP data services. Doing so, however, invokes the costs of using the network as previously mentioned. Thus, the user may desire to minimize to the greatest extent possible any dependence on the cellular network for IP data consumption.

DETAILED DESCRIPTION

Figure 1:
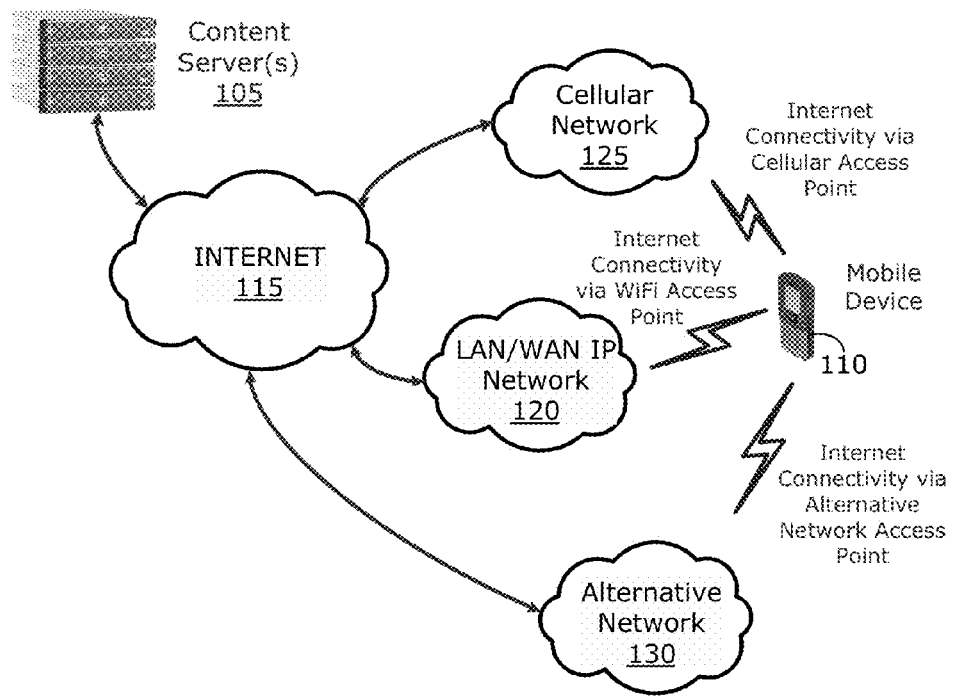
FIG. 1 illustrates an exemplary networked environment for implementing certain exemplary embodiments described herein.

Embodiments described herein disclose methods and techniques to cache IP data locally on the mobile device while the device has non-cellular (e.g., WiFi or WiMax) IP network connectivity. The IP data that is cached may be pre-determined ahead of time based on user usage patterns and/or user instruction. The terms IP data, content, or IP content data may be used interchangeably throughout this disclosure and refer to data of interest to a user of a mobile device wherein the data is remotely stored but is accessible to the mobile device over an IP network connection. The IP network connection may be facilitated by a WiFi transceiver, a cellular transceiver, or an alternate transceiver (e.g., WiMax) housed within the mobile device. The IP data may be representative in whole or in part of textual data, graphical data, audio data, video data, or combinations thereof. The underlying data may be stored or represented in a variety of file formats or protocols and may or may not be encrypted. For example, text data may be stored in a file such as a Microsoft™ Word file, a pdf file, or http text data. Graphical data may be in the form of images stored as bitmap, JPEG, GIF, or other image file formats. Audio data may be stored in an MP3 or .wav format while video data may be stored as MPEG, .avi, etc. The underlying data, regardless of its actual format, is considered IP data when it is packaged and transported to the mobile device over an IP connection. The embodiments are not limited to these examples.

For example, if the user typically accesses the same specific web-sites from the mobile browser most days, the mobile device may be instructed to fetch and cache the IP content from the specific web-site while the mobile device has non-cellular (e.g., WiFi or WiMax) IP network connectivity. In some cases, the mobile device may even include wired IP network connectivity such as, for instance, an Ethernet connection. In this manner, the user may access the web site IP data at a later time through cache memory without having to access a cellular network. The mobile device may also acquire intelligent data as to non-cellular IP network connectivity patterns such that the background caching may be performed at certain times. The caching may also be performed or updated anytime the mobile device has non-cellular IP network connectivity to keep the mobile device as up to date as possible for content that may be refreshed periodically. In addition, the caching may be performed in such a manner that allows the user to access the IP data from the native mobile device application that they normally would. For instance, web browsing data may be accessed using a mobile browser while content specific applications (e.g., Fox News™, CNN™, USA Today™, etc.) that operate on the mobile device in their own applications may be accessed using the native application. In this manner, the user experience does not change when accessing cached IP data. The user may still access the data from the native application she would normally use.

In one embodiment, the mobile device may monitor usage and behavior patterns to create items of content (e.g., IP data) to download and locally store on the mobile device. The mobile device may then pull the content from the content providers over the Internet at a time when the mobile device is typically connected to the Internet via WiFi, WiMax, or another non-cellular IP network access point. The mobile device may collect IP data consumption and usage information associated with a mobile device. The mobile device may predict, based on the collected IP data consumption usage information, IP data the mobile device can be expected to consume at a future time. The mobile device may then automatically download the predicted IP data to the mobile device over a non-cellular connection and store the downloaded predicted IP data in cache memory on the mobile device.

To facilitate the process and help ensure that the cellular data network is not used, the mobile device may also collect non-cellular network connectivity information associated with the mobile device and predict, based on the collected non-cellular network connectivity information, when the mobile device can be expected to be connected to a non-cellular network. The mobile device may then attempt to perform the automatic downloading of the predicted IP data at a time when the mobile device can be expected to be connected to a non-cellular network. If the mobile device is not connected to a non-cellular network it may wait until the mobile device is connected to a non-cellular network before automatically downloading the predicted IP data.

The mobile device may also store the downloaded predicted IP data in cache memory on the mobile device that is associated with the application on the mobile device that would have downloaded the predicted IP data if the download had been manually initiated by a user. This ensures that the user experience when accessing the cached IP data is the same in so far as the same user interface(s) and/or native applications are used as when the user is using a real-time IP network connection to consume IP data. Thus, when there is no non-cellular connection available to the mobile device, the user may still consume the cached IP data by bypassing a cellular network connection and accessing the stored predicted IP data from cache memory using an application on the mobile device associated with the stored predicted IP data in response to a request for the IP data.

In another embodiment, the mobile device may register with a content service provider directly to indicate a desire to receive content (e.g., IP data) from that content provider. The content service provider may then initiate a download to the mobile device in accordance with the request previously made by the user. The content server would push the requested content to the mobile device over the Internet at a time when the mobile device is typically connected to the Internet via WiFi, WiMax, or another non-cellular IP network access point.

For example, the mobile device may send a content request to a content server over an IP network in which the content request is indicative of recurring IP data of interest to the user of the mobile device. The content server may queue the requested IP content data in a buffer associated with the mobile device and send a notification message to the mobile device indicating that the requested IP content data is queued. The mobile device may determine whether it is connected to a non-cellular network and automatically download the queued IP content data from the content server when it is connected to a non-cellular network. The mobile device may then store the downloaded IP content data in cache memory.

The mobile device may also collect non-cellular network connectivity information associated with the mobile device and predict, based on the collected non-cellular network connectivity information, when the mobile device can be expected to be connected to a non-cellular network. The mobile device may then attempt to perform the automatic downloading of the queued IP content data at a time when the mobile device can be expected to be connected to a non-cellular network. If the mobile device is not connected to a non-cellular network it may wait until the mobile device is connected to a non-cellular network before automatically downloading the queued IP content data.

The mobile device may also store the downloaded queued IP content data in cache memory on the mobile device that is associated with the application on the mobile device that would have downloaded the queued IP content data if the download had been manually initiated by a user. This ensures that the user experience when accessing the cached IP data is the same in so far as the same user interface(s) and/or native applications are used as when the user is using a real-time IP network connection to consume IP content data. Thus, when there is no non-cellular connection available to the mobile device, the user may still consume the cached IP content data by bypassing a cellular network connection and accessing the stored queued IP content data from cache memory using an application on the mobile device associated with the stored queued IP content data in response to a request for the IP content data.

In yet another embodiment, the mobile device may monitor usage and behavior patterns to create items of content (e.g., IP data) to download and locally store on the mobile device. The mobile device may then forward the items of content to be stored on the mobile device to an intelligent cache server resident within the Internet. The intelligent cache server may then pull the IP content data from the content providers and push it to the mobile device over the Internet at a time when the mobile device is typically connected to the Internet via WiFi, WiMax, or another non-cellular IP network access point.

For example, the mobile device may send a content request to an intelligent cache server over an IP network in which the content request is indicative of recurring IP data of interest to the user of the mobile device. The intelligent cache server may retrieve the requested IP content data from content servers and queue the requested IP content data in a buffer associated with the mobile device and send a notification message to the mobile device indicating that the requested IP content data is queued. The mobile device may determine whether it is connected to a non-cellular network and automatically download or receive the queued IP content data from the intelligent cache server when it is connected to a non-cellular network. The mobile device may then store the downloaded or received IP content data in cache memory.

The mobile device may also collect non-cellular network connectivity information associated with the mobile device and predict, based on the collected non-cellular network connectivity information, when the mobile device can be expected to be connected to a non-cellular network. The mobile device may then attempt to perform the automatic downloading of the queued IP content data at a time when the mobile device can be expected to be connected to a non-cellular network. If the mobile device is not connected to a non-cellular network it may wait until the mobile device is connected to a non-cellular network before automatically downloading or receiving the queued IP content data.

The mobile device may also store the downloaded queued IP content data in cache memory on the mobile device that is associated with the application on the mobile device that would have downloaded the queued IP content data if the download had been manually initiated by a user. This ensures that the user experience when accessing the cached IP data is the same in so far as the same user interface(s) and/or native applications are used as when the user is using a real-time IP network connection to consume IP content data. Thus, when there is no non-cellular connection available to the mobile device, the user may still consume the cached IP content data by bypassing a cellular network connection and accessing the stored queued IP content data from cache memory using an application on the mobile device associated with the stored queued IP content data in response to a request for the IP content data.

In each of the aforementioned embodiments, the content may then be stored by the mobile device in cache memory such that when the user went to access the content, no Internet connection would be required. Moreover, the user may consume desired content without having to utilize a cellular data connection. In addition, the content download (pull or push) may be timed to repeat at specified intervals or whenever a non-cellular IP network connection is available. The content caching scheme may run as a background process to keep the content as fresh and updated as possible.

Referring now to FIG. 1, an exemplary networked environment 100 for implementing certain exemplary embodiments is described. A content server 105 is representative of an entity that creates and/or distributes content over an IP based network such as, for instance, the Internet 115. The content server 105 may represent a web site or a streaming audio or video service. The content itself may be textual, graphical, audio, video, or some combination thereof. The networked environment 100 also illustrates a mobile device 110, an IP based local area network (LAN) 120, a cellular network 125, and an alternative network 130.

In a typical scenario, the mobile device may connect to the Internet using any of the aforementioned networks 120, 125, 130 via an appropriate access point (not shown). The user of the mobile device may prefer to use one network rather than another given the opportunity. For instance, the user may prefer to connect the mobile device to the Internet 115 using an 802.11 WiFi connection over an IP network like LAN 120. WiFi connectivity may represent the highest quality and lowest cost means of Internet 115 access. However, WiFi connectivity may not always be available to the mobile device. In such cases, one of the other networks may be used to gain Internet 115 access. Internet 115 access via a cellular network 125 is another common means of connectivity. Using the cellular network 125 for IP data services, however, can be costly. Cellular service providers typically charge for the use of the cellular network 125 based on the amount of IP data that is consumed (e.g., uploaded or downloaded). Moreover, the costs increase the more IP data is consumed. Thus, it is often desirable to minimize the use of the cellular network 125 for IP data services.

There may also be one or more alternative networks 130 that may provide access to the Internet 115 for a mobile device 110. One such non-cellular alternative network 130 may be characterized as a WiMax network operable over the 802.16 wireless protocol standard. Another such alternative network 130 may be characterized as a whitespace network. A whitespace network may utilize RF spectrum that is shared with television broadcasters. The television broadcasters do not necessarily need to utilize all the spectrum allocated to them to broadcast their video signals. The unused spectrum may be tapped into to provide an alternative RF access point to a network that can interface with the Internet 115.

Figure 2:
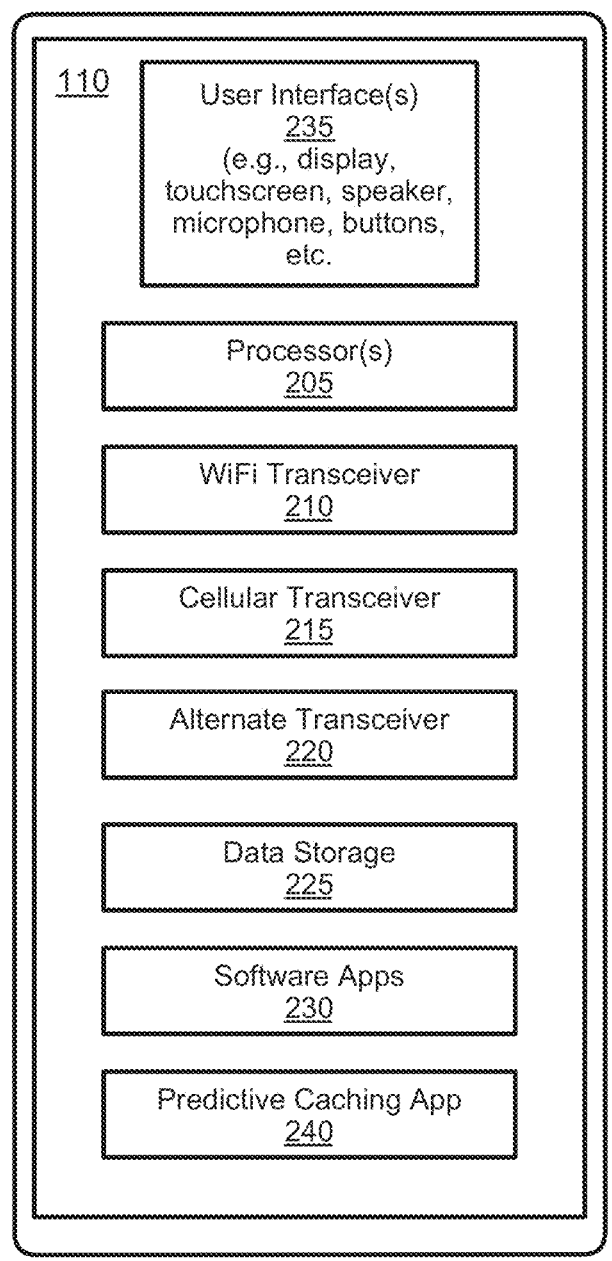
FIG. 2 is a block diagram illustrating some of the functions of a mobile device according to one or more embodiments described herein.

FIG. 2 is a block diagram illustrating some of the functions of a mobile device 110 according to one or more embodiments described herein. A mobile device may include, for instance, a smartphone, a personal digital assistant (PDA) device, a tablet style computer, a laptop or notebook style computer, etc. The mobile device 110 may include a processor or processors 205 for controlling the various components and functions of the mobile device 110. The mobile device 110 may also include multiple RF transceivers such as, for instance, a WiFi transceiver 210, a cellular transceiver 215, and an alternate transceiver 220. The alternate transceiver 220 may also be characterized as a non-cellular transceiver in that it may connect with a network access point to provide access to the Internet 115 without the use or assistance of a cellular network 125.

The WiFi transceiver 210 may be operable to communicate with an IP network access point using one or more of the 802.11 wireless transmission protocols. Upon connection with an IP network access point, the mobile device 110 may exchange IP data with servers or other computers that are connected with or communicable with the Internet 115. This may include content servers 105 shown in FIG. 1.

The cellular transceiver 215 may be operable to communicate with a cellular network 125 for both voice and IP data communications. On the voice side, the cellular network 125 may be based on GSM, CDMA, or other communications protocols while on the IP data side, the cellular network 125 may be based on, for example, GPRS, EDGE, EV-DO, HSPA-D, HSPA-U, LTE, UMTS-WCDMA, UMTS-TDD, etc. As pointed out above, use of the cellular network for IP data services can be costly and therefore to be avoided whenever a viable alternative is available to the mobile device 110.

In one embodiment, the alternate transceiver 220 may be a WiMax transceiver that is operable to communicate with an IP network access point using one or more of the 802.16 wireless transmission protocols. Upon connection with an IP network access point, the mobile device 110 may exchange IP data with servers or other computers that are connected with or communicable with the Internet 115. This may include content servers 105 shown in FIG. 1. In another embodiment, the alternate transceiver 220 may be a whitespace transceiver that is operable to communicate with a whitespace network access point. The whitespace network, in turn, may be communicable with the Internet 115 to allow IP data communications between the mobile device 110 and servers or other computers that are connected with or communicable with the Internet 115. This may include content servers 105 shown in FIG. 1.

The mobile device 110 may further include data storage 225, software applications 230, various user interface(s) 235 a predictive caching application 240. The data storage 225 may include, for example, one or more types of memory devices including, but not limited to, flash memory usable for ROM, RAM, PROM, EEPROM, and cache. The software applications 230 may include, for example, one or more software applications executable on or by the processor(s) 205 including, but not limited to, web browsers, email applications, application specific data and/or audio/video applications, etc. For instance, examples of application specific software video applications could be YouTube™ or Netflix™ while an examples of application specific software audio applications could be Spotify™ or Pandora™. Examples of application specific graphical/text/multimedia software applications may include those for news delivery services like Fox News™, CNN™, The New York Times™, USA Today™, etc. The user interface(s) 235 may include, for example, a display, a touchscreen for soft-key input, speaker(s), microphone(s), a keyboard for hard-key input, and one or more buttons.

The predictive caching application 240 may be operable to determine content of interest to the user of the mobile device 110. The content of interest may then be scheduled for download (e.g., pulled) or forwarded to a web based server for management such that the content of interest may be pushed to the mobile device 110 at appropriate times over a WiFi or WiMax connection and stored in cache memory. The predictive caching application 240 is described further below.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
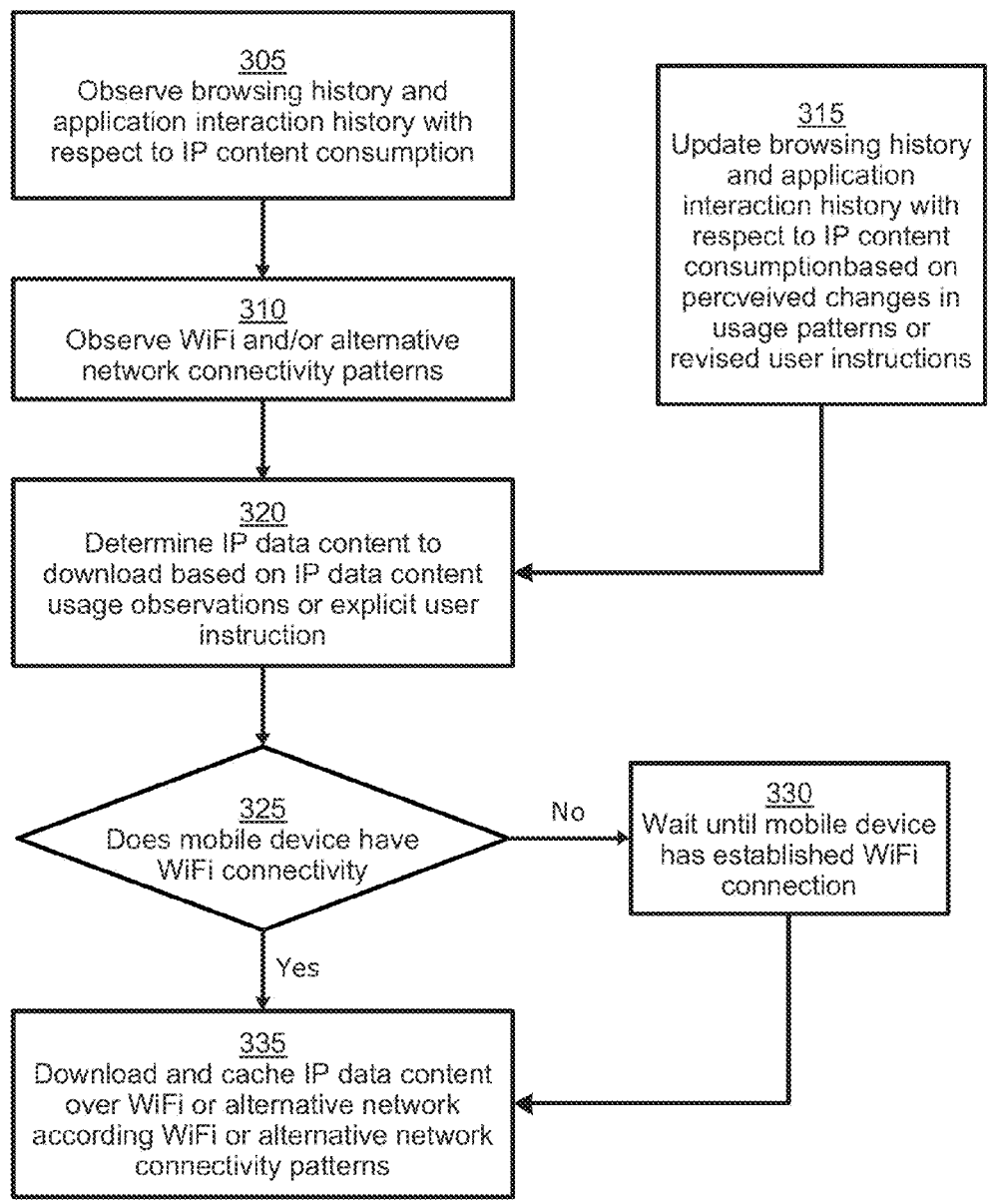
FIG. 3 is a logic flow diagram according to one or more embodiments described herein.

FIG. 3 illustrates one embodiment of a logic flow 300. The logic flow 300 may be representative of some or all of the operations executed by one or more embodiments described herein. In this embodiment, steps are disclosed that allow a mobile device 110 to gather browsing and usage data of the mobile device 110 along with WiFi connectivity patterns to determine content of interest to a user of the mobile device 110. At specified times, this content may be downloaded or pulled from content servers using a WiFi or WiMax connection and stored in cache memory for subsequent consumption by the user.

In the illustrated embodiment shown in FIG. 3, the logic flow 300 may observe the browsing history and software application interaction history of the mobile device 110 with respect to IP data consumption at block 305. For example, the user of the mobile device 110 may regularly visit one or more web sites which may be reflected by the browsing history or some other means of tracking. The user may browse the USA Today™ sports section on a regular basis as well as the NY Times™ web site. Similarly, the user may access locally stored software applications 230 that are used to access the Internet for IP data consumption purposes. Many news outlets have created custom applications that may run on the mobile device 110 and access the IP data stored on their own content servers. This model does not need a standard we browser but rather uses the native application interface designed by the content provider and executing on the mobile device. Thus, the user may consume IP data from the USA Today™ using a USA Today™ app on the mobile device. This native application has its own user interface and data presentation construct that the user may prefer. Collecting this browsing and application interaction data over a period of time may yield activity that the user of the mobile device regularly engages. The patterns may then yield a predictable model of future IP data consumption.

The logic flow 300 may observe WiFi and/or alternative network connectivity patterns at block 310. For example, the mobile device 110 may typically have a WiFi connection or an alternative network (e.g., WiMax) connection everyday between the hours of midnight-7:00 AM, 8:00 AM-12:00 PM, 1:00 PM-5:00 PM, and again from 9:00 PM-midnight. This schedule is more or less reflective of a typical workday in which the mobile device 110 has access to WiFi or WiMax at home from 9:00 PM-7:00 AM, loses access while commuting to a workplace, regains access while at work, and loses access again while commuting home. Similar patterns could be established for students or others. The predictive caching application 240 can, over time, determine a fairly reliable time frame for expected WiFi or WiMax connectivity.

In the illustrated embodiment shown in FIG. 3, the logic flow 300 may update the browsing history and software application interaction history of the mobile device 110 with respect to IP data consumption at block 315. For example, the user of the mobile device 110 may collect and forward additional browsing history or software application interaction history data to the predictive caching application 240. This helps keep the predictive caching application 240 current with respect to the user's most recent usage patterns.

The logic flow 300 may determine IP data content to download based on IP data content usage observations or explicit user instruction at block 320. For example, the predictive caching application 240 may analyze the observed browsing history and application interaction history to determine that the mobile device regularly visits the same web site(s) and typically accesses the same software applications that retrieve IP data content from a content provider over the Internet 115. Using this data, the predictive caching application 240 may create a script, background process, or other mechanism that identifies the content provider and the content that the mobile device will most likely want to access throughout the day.

The logic flow 300 may determine whether the mobile device 110 has a current WiFi connection at block 325. For example, the predictive caching application 240 may query the WiFi transceiver 210 to determine whether the WiFi transceiver 210 is active and connected to an IP network access point and therefore capable of exchanging IP data over the Internet 115. If the WiFi transceiver 210 does not currently have a connection with an IP network access point, the logic flow 300 may wait until the mobile device 110 has established a WiFi connection at block 330. For example, the predictive caching application 240 may attempt to invoke the WiFi transceiver and its associated intelligence to scan for and connect with an available WiFi network. The predictive caching application 240 may continuously or periodically monitor the WiFi connection status of the WiFi transceiver 240 and only pull IP content data it has determined to be of interest to the user or that the user has specifically requested when a WiFi connection exists. By running the predictive caching application 240 in the background, it can be ready to download as soon as a WiFi connection is established.

The logic flow 300 may download and cache IP content data over WiFi or an alternative network at block 335. For example, if the predictive caching application 240 determines that the mobile device 110 does have WiFi connectivity, the predictive caching application 240 can download IP content data it has determined to be of interest to the user or that the user has specifically requested. The downloaded IP content data may then be stored in local cache memory. The downloading and caching step of block 335 may be optimized using the WiFi connectivity pattern data observed in block 310. Using this information, the predictive caching application 240 may attempt to download IP content data during time frames that the mobile device 110 is typically connected to a WiFi network. For example, the mobile device may typically be coupled with a WiFi network at 5:00 AM each morning. This may be because the user of the mobile device 110 is either at home in a WiFi environment or perhaps at a hotel that also includes a WiFi environment. The predictive caching application 240 may attempt to download desired IP data at 5:00 AM each day so that the mobile device 110 can cache the IP data for later access by the user even if no WiFi connection exists. In addition, the predictive caching application 240 may run in the background and periodically re-fresh the cached data with new IP content data anytime a WiFi connection exists. Each successful refresh helps keep the cached data as up to date as possible.

Figure 4:
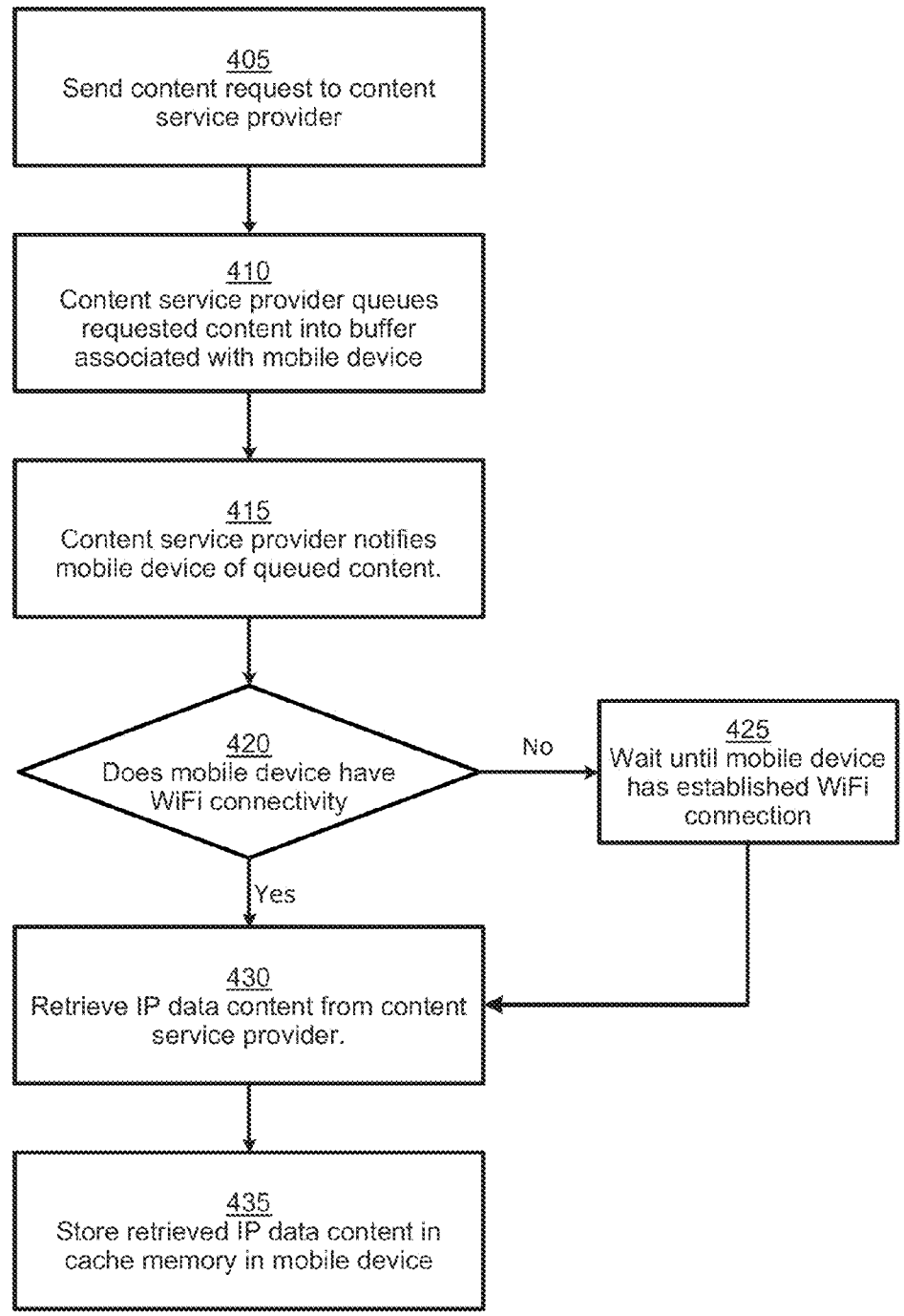
FIG. 4 is a logic flow diagram according to one or more embodiments described herein.

FIG. 4 illustrates one embodiment of a logic flow 400. The logic flow 400 may be representative of some or all of the operations executed by one or more embodiments described herein. In this embodiment, steps are disclosed that allow a mobile device 110 to establish a service relationship with a content provider. The service relationship represents IP content desired by the user that is to be pushed or pulled from the content service provider to the mobile device 110 using a WiFi or WiMax connection. The IP content may then be stored in cache memory for subsequent consumption by the user.

In the illustrated embodiment shown in FIG. 4, the logic flow 400 may send a content request to a content service provider at block 405. For example, the predictive caching application 240 may initiate a communication session with a content service provider over the Internet 115. Alternatively, a communication session may be established between the content service provider and the mobile device 110 using a mobile web browser application. In another embodiment, a communication session may be established between the content service provider and a computer device that is not the mobile device 110 using a browser application. The other computer device may be a computer, a tablet computer, an IP network enabled television, or other IP network connectable device. In this embodiment, the separate computer device may interact with the content service provider for purposes of registering the mobile device 110 with the content service provider.

The registration process may include creating an account that uniquely identifies the mobile device 110 as the intended recipient of IP content data. The user may specify what IP content it desires during registration. For example, the user may register with a web site such as MLB.com™ and indicate that all top stories, or all stories pertaining to a favorite team be queued for download. The user may further specify that recent scores, standings, and schedules also be queued for download. In another example, the user may register with a web site such as CNN.com™ and indicate that all top stories, all stories mentioning the word "President", the weather section of the web site, and various stock quotes be queued for download. There may also be a catch-all default that would queue the entire web site for download. In still another example, the user may register with a web site such as Netflix™ and indicate that certain movies or television shows be queued for download. The user may also specify that it would like Netflix™ to choose 2 movies and 3 television shows on its own based on prior viewing history to be queued for download. As is evident, there can be a wide variety of content selection options between the user and the content service provider. The examples above are illustrative and not limiting to the embodiments described herein.

The logic flow 400 may queue the requested content in a buffer associated with the mobile device 110 at block 410. For example, the content service provider may aggregate the requested content and place it within a buffer uniquely associated with the mobile device 110 as per the registration process. The logic flow 400 may then notify the mobile device 110 that the requested content has been queued for download at block 415. This may be accomplished, for example, via text message, a pushed alert, email, etc. In an automated system, the notification does not necessarily need to be made known to the user as described above. Rather, the predictive caching application 240 may receive the notification and act on its own to retrieve the desired content. When the notification is received by the mobile device 110, the predictive caching application 240 may determine if the mobile device 110 is currently connected to a WiFi network at block 420. If not, the predictive caching application 240 will not attempt to retrieve the content from the content service provider. Rather, the predictive caching application 240 will wait until a WiFi connection exists before downloading the queued content from the content service provider at block 430. If the mobile device 110 happens to lose the WiFi connection during the download process, the predictive caching application 240 can automatically terminate the download until a WiFi connection for the mobile device 110 is reestablished. This ensures that a cellular network 125 is not utilized to download any content and therefore avoids incurring any wireless cellular data usage fees.

The logic flow 400 may store the requested content in cache memory on the mobile device 110 at block 435. For example, the content downloaded from the content service provider over a WiFi connection may be locally stored in data storage component 225 on the mobile device 110. The user may then access the stored data without needing any type of network connection whatsoever.

Figure 5:
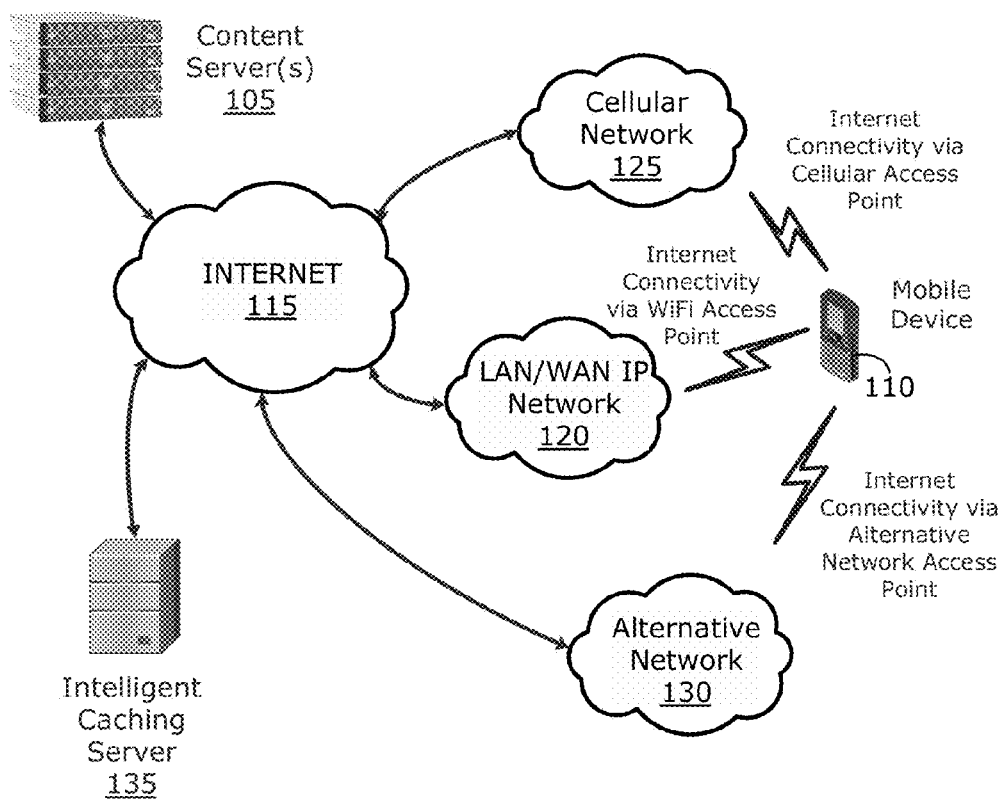
FIG. 5 illustrates an exemplary networked environment for implementing certain exemplary embodiments described herein.

FIG. 5 illustrates an exemplary networked environment for implementing certain exemplary embodiments described herein. FIG. 5 is a duplication of FIG. 1 with an additional component added. Thus, to the extent that FIG. 5 duplicates FIG. 1, the disclosure of FIG. 1 applies equally to FIG. 5 and is not repeated here.

The additional component in FIG. 5 may be characterized as an intelligent caching server 135. The intelligent caching server 135 resides in the cloud (e.g., accessible via the Internet 115). The intelligent caching server 135 my have a relationship with the mobile device 110 such that data is communicated and exchanged between the mobile device 110 and the intelligent caching server 135. For example, the mobile device 110 may provide historical browsing data as well as software application interaction data to the intelligent caching server 135. The intelligent caching server 135 may then analyze this data to determine or predict the type of IP content data the user of mobile device 110 will likely attempt to access at a later time. The intelligent caching server 135 may then go out and aggregate the IP content data and store it on behalf of the mobile device 110. The intelligent caching server 135 may then notify the mobile device 110 of the stored IP content data so that the mobile device 110 may, at a time when it is connected to a WiFi network, download and locally store the IP content data.

Figure 6:
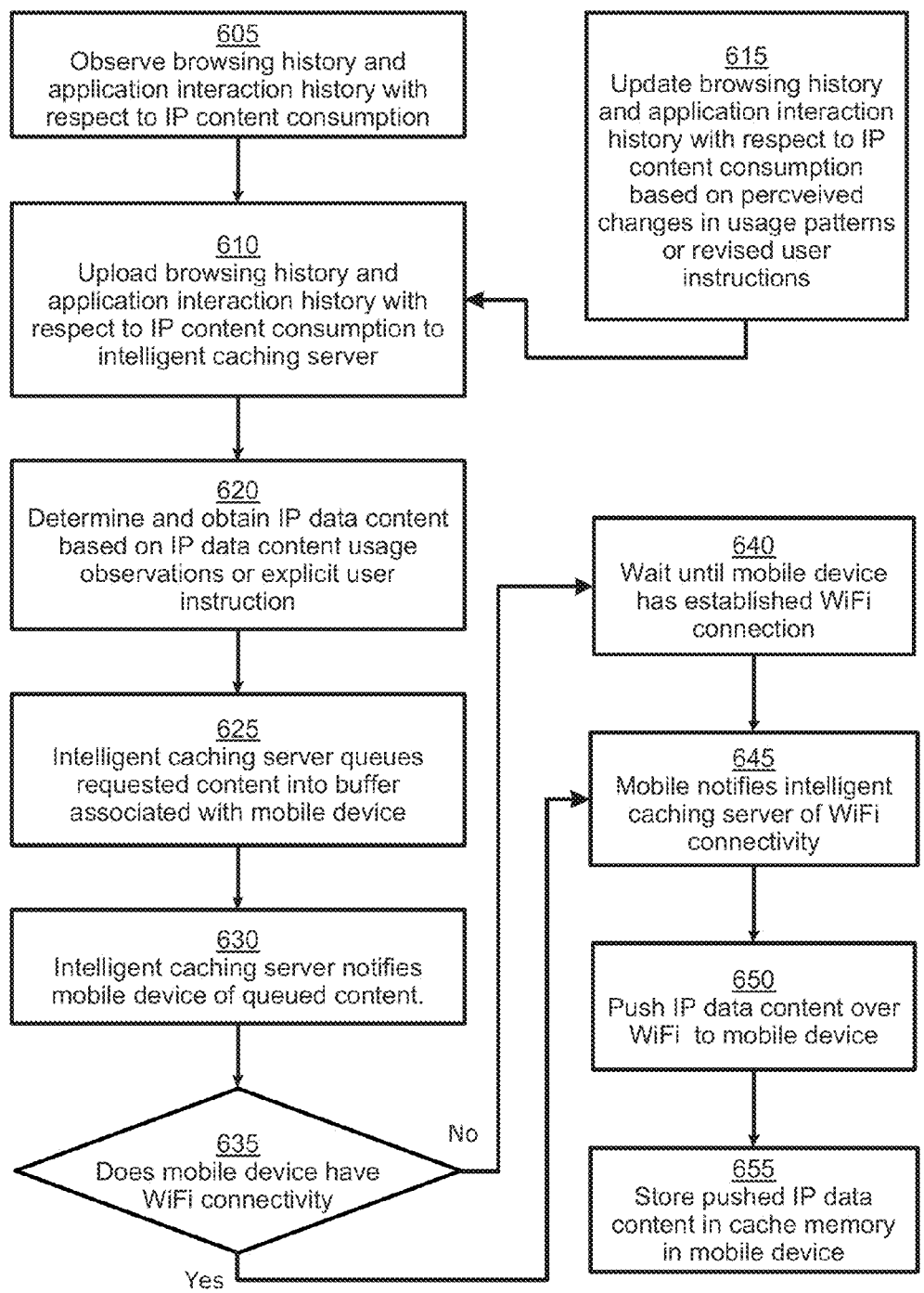
FIG. 6 is a logic flow diagram according to one or more embodiments described herein.

FIG. 6 illustrates one embodiment of a logic flow 600. The logic flow 600 may be representative of some or all of the operations executed by one or more embodiments described herein. In this embodiment, steps are disclosed that allow a mobile device 110 to gather browsing and usage data of the mobile device 110 along with WiFi connectivity patterns to determine content of interest to a user of the mobile device 110. This information may then be sent to an intelligent caching server 135 that will pull the content from the various content service providers and store it so that the mobile device 110 may, at specified times using a WiFi or WiMax connection, download it. The incoming content to the mobile device 110 may then be stored in cache memory for subsequent consumption by the user.

In the illustrated embodiment shown in FIG. 6, the logic flow 600 may observe the browsing history and software application interaction history of the mobile device 110 with respect to IP data consumption at block 605. For example, the user of the mobile device 110 may regularly visit one or more web sites which may be reflected by the browsing history or some other means of tracking. The user may browse the USA Today™ sports section on a regular basis as well as the NY Times™ web site. The logic flow 600 may then upload the browsing and software application interaction history of the mobile device 110 with respect to IP data consumption history to an intelligent caching server 135 at block 610.

The logic flow 600 may update the browsing history and software application interaction history of the mobile device 110 with respect to IP data consumption at block 615. For example, the user of the mobile device 110 may periodically collect and forward additional browsing history or software application interaction history data to the predictive caching application 240. The updated history may then be uploaded to the intelligent caching server 135 as described in block 610. This helps keep the predictive caching application 240 current with respect to the user's most recent usage patterns.

The logic flow 600 may determine and obtain IP data content based on IP data content usage observations or explicit user instruction at block 620. For example, the intelligent caching server 135 may analyze the uploaded browsing history and application interaction history to determine that the mobile device regularly visits the same web site(s) and typically accesses the same software applications that retrieve IP data content from a content provider over the Internet 115. Using this data, the intelligent caching server 135 may then connect to the content provider(s) and download the content deemed to be of interest to the mobile device 110.

The logic flow 600 may queue the content obtained from content providers at block 625. For example, the intelligent caching server 135 may store the downloaded content deemed to be of interest to the mobile device 110 in a local buffer that is associated or linked with the mobile device 110. The intelligent caching server 135 may then push a notification to the mobile device 110 informing the mobile device 110 of the queued content waiting on the intelligent caching server 135 at block 630.

Upon receipt of the content notification from the intelligent caching server 135, the logic flow may determine if the mobile device 110 currently has a WiFi connection at block 635. For example, the predictive caching application 240 may query the WiFi transceiver 210 to determine whether the WiFi transceiver 210 is active and connected to an IP network access point and therefore capable of exchanging IP data over the Internet 115. If the WiFi transceiver 210 does not currently have a connection with an IP network access point, the logic flow 600 may wait until the mobile device 110 has established a WiFi connection at block 640. For example, the predictive caching application 240 may attempt to invoke the WiFi transceiver and its associated intelligence to scan for and connect with an available WiFi network. The predictive caching application 240 may continuously or periodically monitor the WiFi connection status of the WiFi transceiver 240 and notify the intelligent caching server 135 of WiFi connectivity when it exists at block 645. By running the predictive caching application 240 in the background, it can be ready to notify the intelligent caching server 135 as soon as a WiFi connection is established.

The logic flow 600 may push IP content data over WiFi or an alternative network to the mobile device 110 at block 650. For example, when the pre intelligent caching server 135 receives notification that the mobile device 110 does have WiFi connectivity, the intelligent caching server 135 can push IP content data it has determined to be of interest to the user or that the user has specifically requested to the mobile device. The downloading and caching step of block 335 may be optimized using observed WiFi connectivity pattern data. Using this information, the intelligent caching server 135 may attempt to push IP content data during time frames that the mobile device 110 is typically connected to a WiFi network. For example, the mobile device may typically be coupled with a WiFi network at 5:00 AM each morning. This may be because the user of the mobile device 110 is either at home in a WiFi environment or perhaps at a hotel that also includes a WiFi environment. The intelligent caching server 135 may attempt to push desired IP data at 5:00 AM each day so that the mobile device 110 can cache the IP data for later access by the user even if no WiFi connection exists.

Alternatively, the logic flow 600 may download and cache IP content data over WiFi or an alternative network. For example, if the predictive caching application 240 determines that the mobile device 110 does have WiFi connectivity, the predictive caching application 240 can download IP content data it has determined to be of interest to the user or that the user has specifically requested from the intelligent caching server 135. The downloading and caching step may be optimized using the WiFi connectivity pattern data observed in block 310. Using this information, the predictive caching application 240 may attempt to download IP content data during time frames that the mobile device 110 is typically connected to a WiFi network. In addition, the predictive caching application 240 may run in the background and periodically re-fresh the cached data with new IP content data anytime a WiFi connection exists and new content data is available on the intelligent caching server. Each successful refresh helps keep the cached data as up to date as possible.

The logic flow 600 may store pushed or pulled IP content data in cache memory of the mobile device 110 at block 655. For example, the predictive caching application 240 may analyze the received pushed IP content data and store it appropriately in local mobile device cache memory. For instance, IP content data associated with a web site may be stored in web browser cache memory. If the IP content data is associated with a particular software application 230 rather than a generic web browser, the predictive caching application 240 may store the data in a cache buffer associated with that software application 230. This storage mechanism allows the user to access the IP content data using the same user interface(s) and/or native application (e.g, web browser, Weather Channel™ app, ESPN™ app, CNN™ app, etc.) as always. The end result is a data consumption experience for the user that is no different than if the user had just requested and downloaded the IP content data.

Figure 7:
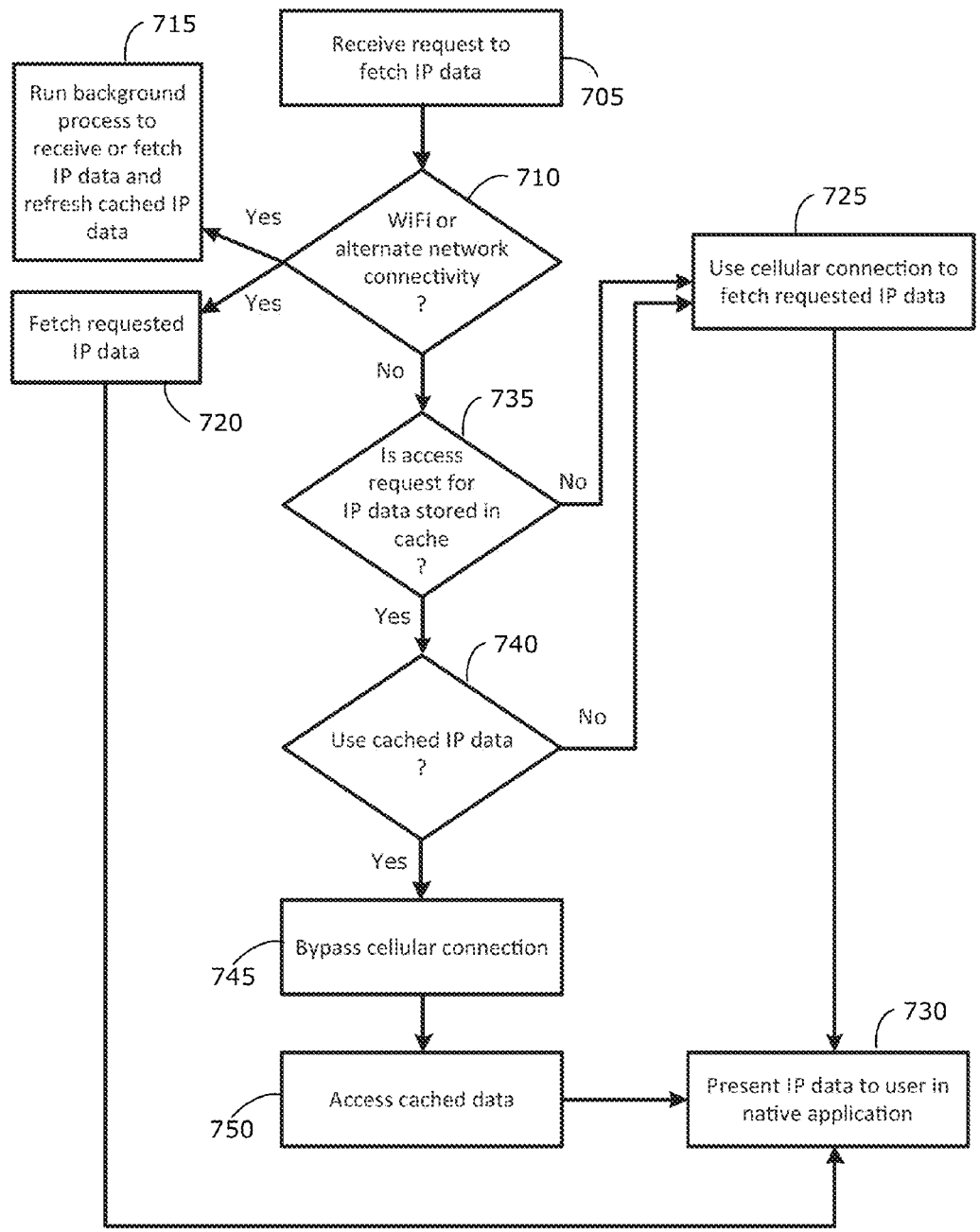
FIG. 7 is a logic flow diagram according to one or more embodiments described herein.

FIG. 7 illustrates one embodiment of a logic flow 700. The logic flow 700 may be representative of some or all of the operations executed by one or more embodiments described herein. In this embodiment, steps are disclosed that allow a mobile device 110 to consume, on the mobile device 110, cached IP content data.

In the illustrated embodiment shown in FIG. 7, the logic flow 700 may receive a request to fetch IP data at block 705. For example, the user of the mobile device 110 may be executing a web browser and request access to a particular URL. In another example, the user may be running a particular software application 230 on the mobile device 110. The software application 230 may receive input from the user that causes it to fetch IP data from a content provider outside the mobile device 110. The content provider may be accessible via the Internet 115.

The logic flow 700 may then determine if the mobile device 110 has a Wifi or alternate network connection at block 710. Alternate network connection excludes a cellular network connection since an object is to minimize access to and use of a cellular network for non-voice (e.g., IP data) purposes. When the mobile device 110 does have a WiFi or alternate network connection as determined at block 710, the predictive caching application 240 may run in the background to receive and/or refresh cached IP data at block 715. Block 715 may be implemented using one or more of the embodiments described in FIG. 3, 4, or 6. In addition, when the mobile device 110 does have a WiFi or alternate network connection, the mobile device 110 may execute any requests or instructions to fetch IP data via a connection with the Internet over WiFi or an alternate network. The downloaded IP data may then be presented to the user from within the native application used to make the request over one or more of the user interface(s) 235 of the mobile device 110 at block 730.

When the mobile device 110 does not have a WiFi or alternate network connection as determined at block 710, the logic flow 700 determines if the request for IP data is for data already stored in local cache memory at block 735. If the IP data is not already stored in local cache memory, the mobile device may use the cellular data network 125 to download the requested IP data. Use of the cellular data network 125 may be automatic or allowed only upon an affirmative user response to a prompt. If the IP data is already stored in local cache memory, the mobile device may prompt the user to use the cached data at block 740. If the user responds negatively, the request may be processed live using a connection to the cellular network 125. Otherwise, the cellular network 125 may be bypassed at block 745 and the IP data may be accessed via the cache memory at block 750. The IP data may then be presented to the user from within the native application used to make the request over one or more of the user interface(s) 235 of the mobile device 110 at block 730.

It should be noted that the use of WiFi with respect to the description of FIGS. 3-7 may be substituted with an alternative non-cellular IP network protocol or standard such as, but not limited to, WiMax or a whitespace network. In addition, a wired IP network connection such as Ethernet, if available to the mobile device 110, may be considered an alternative network 130.

The invention claimed is:

1. A method comprising:
in a mobile device having both a cellular transceiver and at least one other RF transceiver communicable with a non-cellular IP network access point:
  collecting Internet Protocol (IP) data consumption information associated with the mobile device;
  predicting, based on the collected IP data consumption information, IP data the mobile device is expected to consume at a future time;
  automatically bypassing any cellular network connection and downloading the predicted IP data to the mobile device using the at least one other RF transceiver over the non-cellular IP network access point;
  storing the downloaded predicted IP data in cache memory on the mobile device such that the stored IP data is not transported over a cellular network; and
  in response to a request for the predicted IP data and when no non-cellular IP network access point connection is available to the mobile device:
    bypassing an available cellular network connection; and
    accessing the stored predicted IP data from cache memory using an application on the mobile device associated with the stored predicted IP data.

2. The method of claim 1 further comprising:
collecting non-cellular IP network connectivity information associated with the mobile device;
predicting, based on the collected non-cellular IP network connectivity information, when the mobile device can be expected to be connected to the non-cellular IP network access point; and
attempting to perform the automatically downloading the predicted IP data step at a time when the mobile device is predicted to be connected to the non-cellular IP network access point.

3. The method of claim 1 further comprising waiting until the mobile device is connected to the non-cellular IP network access point before automatically downloading the predicted IP data.

4. The method of claim 1 further comprising storing the downloaded predicted IP data in cache memory on the mobile device wherein the cache memory is associated with an application on the mobile device that would have downloaded the predicted IP data if the download had been manually initiated by a user.

5. The method of claim 1 wherein the non-cellular IP network access point is one of a WiFi IP network access point, a WiMax IP network access point, and a whitespace IP network access point.

6. A method comprising:
in a content server within an IP network:
  receiving a content request from a mobile device having both a cellular transceiver and a non-cellular RF transceiver, the content request indicative of recurring IP content data of interest to the mobile device;
  queuing the requested IP content data in a buffer associated with the mobile device; and
  automatically downloading the queued IP content data to the mobile device to be stored in a cache memory only when the mobile device is connected to a non-cellular IP network access point.

7. The method of claim 6 further comprising:
receiving non-cellular IP network connectivity information associated with the mobile device;
predicting, based on the received non-cellular IP network connectivity information, when the mobile device can be expected to be connected to a non-cellular IP network access point; and
attempting to perform the automatically downloading the queued IP content data step at a time when the mobile device is predicted to be connected to a non-cellular IP network access point.

8. The method of claim 6 further comprising waiting until the mobile device is connected to a non-cellular IP network access point before automatically downloading the queued IP content data.

9. The method of claim 6 further comprising storing the downloaded IP content data in cache memory on the mobile device wherein the cache memory is associated with an application on the mobile device that would have downloaded the IP content data if the download had been manually initiated by a user.

10. The method of claim 6 wherein the non-cellular IP network access point is one of a WiFi IP network access point, a WiMax IP network access point, and a whitespace IP network access point.

11. A method comprising:
in an intelligent cache server within an IP network;
  receiving a content request from a mobile device having both a cellular transceiver and a non-cellular RF transceiver, the content request indicative of recurring IP content data of interest to the mobile device;
  retrieving the requested IP content data from one or more content servers;
  queuing the requested IP content data in a buffer associated with the mobile device;
  automatically downloading or receiving the queued IP content data to the mobile device to be stored in cache memory only when the mobile device is connected to a non-cellular IP network access point.

12. The method of claim 11 further comprising:

receiving non-cellular IP network connectivity information associated with the mobile device;

predicting, based on the received non-cellular IP network connectivity information, when the mobile device can be expected to be connected to a non-cellular IP network access point; and attempting to perform the automatically downloading or receiving the queued IP content data step at a time when the mobile device is predicted to be connected to a non-cellular IP network access point.

13. The method of claim 11 further comprising waiting until the mobile device is connected to a non-cellular IP network access point before automatically downloading or receiving the queued IP content data.

14. The method of claim 11 further comprising storing the downloaded or received IP content data in cache memory on the mobile device that is associated with an application on the mobile device wherein the cache memory would have downloaded the IP content data if the download had been manually initiated by a user.

15. The method of claim 11 wherein the non-cellular IP network access point is one of a WiFi IP network access point, a WiMax IP network access point, and a whitespace IP network access point.

* * * * *